UNITED STATES PATENT OFFICE 2,395,581

MODIFIED VINYL CHLORIDE-FUMARIC ESTER COPOLYMER

Henry John Richter, Wilmington, Del., assignor to E. I. du Pont de Nemours & Company, Wilmington, Del., a corporation of Delaware No Drawing. Application November 12, 1942, Serial No. 465,368

9 Claims. (Cl. 260—36)

This invention relates to new compositions of matter comprising polyvinyl resins. More particularly, it relates to plastic compositions comprising the polymers obtained by the conjoint polymerization of vinyl chloride and esters of fumaric acid. More specifically this invention relates to plastic compositions comprising polymers obtained by the conjoint polymerization of vinyl chloride with fumaric esters and alkoxyalkyl esters of carboxylic acids having at least two oxygen-bearing functional groups.

In general, products obtained by the polymerization of polyvinyl halides either alone or in combination with another polymerizable material are not suitable for a wide variety of applications due to the fact that films of these products are either quite stiff at room temperature or are brittle at low temperatures. For many uses it is essential to have products showing a high degree of pliability and low temperature flexibility. This invention has as its general objective the preparation of pliable plastic compositions showing good low temperature toughness based on the copolymers obtained by the conjoint polymerization of vinyl chloride and fumaric esters.

The above objectives have been accomplished by preparing compositions of matter comprising the copolymers obtained by the conjoint polymerization of vinyl chloride and fumaric esters and alkoxyalkyl esters of organic carboxylic acids having at least two oxygen-bearing functional groups.

The copolymers obtained by the conjoint polymerization of vinyl chloride and fumaric esters, prepared as described in a copending application of H. W. Arnold, Serial No. 427,921, filed January 23, 1942, are advantageously modified with alkoxyalkyl esters of organic carboxylic acids having at least two oxygen-bearing functional groups. Two general methods have been employed for modifying the polymer. In one method the copolymer is thoroughly mixed with the alkoxyalkyl ester by working on heated smooth rolls with or without the aid of a solvent such as acetone, until a homogeneous plastic mass is obtained. Or the composition may be prepared by dissolving the copolymer and modifier in a mutual solvent with the aid of heat followed by removal of the solvent. The proportion of the resin and modifier may be varied very widely and the amount used depends on the degree of softness that is desired in the finished product and the compatibility of the modifier. In general the pliability of the product increases rapidly as the proportion of the alkoxyalkyl ester is increased. The composition obtained by either of the above methods may be further modified and utilized in a wide variety of applications. The following examples will further illustrate the practice of the invention. In these examples the parts are given by weight, and the viscosity of the copolymer as reported, is the viscosity of a 10% solution of the copolymer in cyclohexanone at 25° C.

Example I

A mixture of 20 parts of the copolymer prepared by polymerizing conjointly vinyl chloride (95 parts) and diethyl fumarate (5 parts) having a viscosity of 5.5 poises and prepared as described in copending application of H. W. Arnold, Serial No. 427,921, 8.57 parts of di(butoxyethyl) sebacate, 0.2 parts of phenoxypropylene oxide and 40 parts of acetone, added to facilitate mixing, is thoroughly worked together on heated, smooth rolls until free of the added acetone. The resulting sheet is then subjected to a press polishing treatment by heating between polished plates at 110–125° C. and 250 lbs. per sq. in. pressure. The clear, colorless, pliable film thus obtained has a tensile strength of 2840 lbs. per sq. in., elongates 300% before breaking, exhibits a high degree of flexibility even at temperatures below −50° C. and may be flexed over 2,000,000 times before cracking.

Example II

To 20 parts of the copolymer prepared by the conjoint polymerization of vinyl chloride (95 parts) and dimethyl fumarate (5 parts) having a viscosity of 4 poises, there is added 6.66 parts of di(butoxyethyl) sebacate and sufficient acetone to make an easily homogenized paste. This mixture is then thoroughly mixed on heated smooth rolls and the resulting plastic sheet subjected to press polishing as described in Example I. The transparent, pliable film thus obtained has a tensile strength of 2710 lbs. per sq. in., elongates 275% before breaking, and can be bent sharply at temperatures below −50° C. without breaking. A wide range of products may be obtained by the above procedure by the simple expedient of varying the proportion of the alkoxyalkyl ester in the composition. Lower proportions of di(butoxyethyl) sebacate give less pliable films which, however, still exhibit a high degree of low temperature flexibility. As the proportion of the modifier is increased the films become more pliable and show lower tensile strength. Thus, a film containing 35% of di(butoxyethyl) sebacate and prepared as described above has a tensile strength of 1600 lbs. per sq. in. The flexibility at low temperatures increases as the proportion of modifier is increased.

Example III

A mixture comprising 25 parts of vinyl chloride-diethyl fumarate (95.5) copolymer, having a viscosity of 7 poises, and 10.71 parts of methoxyethyl acetyl ricinoleate is homogenized on heated smooth rolls and treated as described in Example I. The clear, pliable film thus obtained has a tensile strength of 2150 lbs. per sq. in., elongates 280% before breaking, can be flexed at temperatures as low as −50° C. without breaking, and resists two million flexes before failure.

Example IV

A film is prepared as described in Example I, of 20 parts of 95:5 vinyl chloride-diethyl fumarate copolymer having a viscosity of 8–10 poises and 8.57 parts of di(benzyloxyethyl) sebacate. The clear, pliable film has a tensile strength of 3100 lbs. per sq. in., elongates 215% before breaking and is still flexible at −26° C.

Example V

Twenty parts of the copolymer obtained by the conjoint polymerization of 95 parts of vinyl chloride and 5 parts of dimethyl fumarate having a viscosity of 4 poises, is thoroughly mixed with 8.57 parts of di(butoxyethyl) phthalate on heated smooth rolls. The resultant pliable film is then subjected to a press polishing treatment as described in Example I. A clear film is obtained which has a tensile strength of 2130 lbs. per sq. in. and which is pliable at temperatures as low as −30° C.

Example VI

Fifteen parts of the copolymer obtained by the conjoint polymerization of 88 parts of vinyl chloride and 12 parts of diethyl fumarate is mixed with 5 parts of tri(butoxyethyl)citrate and formed into a film as described in Example I. A clear, pliable film is obtained.

Example VII

A mixture comprising 20 parts of the polymer obtained by the conjoint polymerization of 95 parts vinyl chloride and 5 parts of dimethyl fumarate (having a viscosity of 10.5 poises), 4.28 parts of methoxyethyl acetyl ricinoleate and 4.28 parts of di(2-ethylhexyl) phthalate is thoroughly mixed on heated rolls and formed into a film by the procedure described in Example I. The clear, pliable film obtained has a tensile strength of 3000 lbs. sq. in., elongates 280% before breaking, and is flexible at temperatures as low as −31° C.

Example VIII

A mixture comprising 10 parts of vinyl chloride-diethyl fumarate (95:5) having a viscosity of 10 poises, 4.28 parts of methoxyethyl acetyl ricinoleate, 50 parts of methyl ethyl ketone, 25 parts of xylene, and 0.1 part of phenoxypropylene oxide is heated under reflux with stirring until a clear solution is obtained which is then spread on a glass plate with the aid of a doctor knife. After evaporation of the solvent, the film is conditioned for 20 hours at 65° C. The colorless, pliable film thus obtained has a tensile strength of 2350 lbs. per sq. in., elongates 350% before breaking and is flexible at temperatures as low as −30° C.

Example IX

A solution is prepared by dissolving 10 parts of 95:5 vinyl chloride-diethyl fumarate copolymer having a viscosity of 5.5 poises, 2.14 parts methoxyethyl acetyl ricinoleate, 2.14 parts of dibutyl sebacate, cast, and treated as described in Example VIII. The resulting clear, pliable film has a tensile strength of 1600 lbs. per sq. in., elongates 315% before breaking, is flexible at temperatures as low as −42° C. and resists 3,000,000 flexes before cracking.

Example X

A mixture comprising 20 parts of the polymer obtained by the conjoint polymerization of 95 parts vinyl chloride and 5 parts of dimethyl fumarate having a viscosity of 2.9 poises, and 10.8 parts of di(butoxyethyl) sebacate is formed into a film as described in Example I above. The clear, pliable, somewhat elastic film has a tensile strength of 1830 lbs. per sq. in., elongates 330% before breaking and is flexible at temperatures below −50° C.

Example XI

A composition is prepared by dissolving 11.1 parts of vinyl chloride-diethyl fumarate (95:5) copolymer and 2.22 parts of di(butoxyethyl) sebacate in 77.8 parts of solvent consisting of a 2:1 methyl ethyl ketone-toluene mixture. A dispersion of bone black (4.44 parts) in 4.44 parts of di(butoxyethyl)sebacate is thoroughly mixed into the solution and the resulting composition coated on 1.32—53" high count sateen fabric until a coating weight of 16.1 oz. per 50" yd. is obtained. The coated fabric thus obtained is very attractive in appearance and shows good physical properties as evidenced by the fact that it may be flexed over 1,500,000 times before failure, (Schiltknecht test, Bulletin No. 105, Alfred Suter, 200 Fifth Avenue, New York City), is not brittle at temperatures as low as −50° C., resists 32,000 scrubbings (Automotive Industries, vol. 49, pages 1262–1266) and is resistant to marring at temperatures as high as 135° C. These properties are not appreciably affected after aging for two weeks at 105° C.

Example XII

A composition based on 63.2 parts vinyl chloride-dimethyl fumarate (95:5) copolymer, 29.8 parts di(butoxyethyl) sebacate, 7.0 parts brown pigment and 0.63 part of phenoxypropylene oxide is prepared by swelling the copolymer with an equal weight of acetone which contains the di(butoxyethyl) sebacate and the phenoxypropylene oxide and in which the pigment is dispersed. This mixture is then worked in a cold Banbury mixer for 15 minutes, milled for ½ hour on cold rubber rolls, followed by 5 minutes' milling at 110° C. to remove the solvent. This composition is then calendered on sateen fabric which is first coated with five applications of the following composition:

| | Parts |
|---|---|
| Vinyl chloride-diethyl fumarate (80:20) copolymer | 18.0 |
| Di(butoxyethyl) sebacate | 8.5 |
| Hydrogenated rosin | 2.0 |
| Methyl ethyl ketone | 71.5 |

The calendering rolls are maintained at the following temperatures; top roll 210° F.; middle roll 200° F.; bottom roll 122° F. The coated fabric has a slight tack as it comes off the rolls but it soon sets up to a dry, hard-surfaced pliable material.

Example XIII

Seven hundred and fifty-five parts of a vinyl chloride-diethyl fumarate copolymer containing about 5% by weight of vinyl chloride and having a viscosity of 9-10 poises are mixed with 150 parts of acetylated castor oil, 75 parts of di(butoxyethyl) sebacate, and 1 part each of bone black and phenoxypropylene oxide. The mixture is slurried in acetone and allowed to stand several hours after which it is thoroughly homogenized on a standard rubber mill at 200-300° F. and the milling continued until the acetone is removed.

The material thus obtained is endowed with excellent physical and electrical properties which make it eminently suitable for wire insulation. Among its many outstanding electrical characteristics are the following: dielectric constant of 4.5-5 and a power factor at 1000 cycles of 0.08-0.1. The above composition is extruded over wire to form an insulating covering. The operation is accomplished through the use of a #1 Royle stuffer at a temperature of 200-250° F. at the extrusion head. It is advisable to soften the plasticized resin by milling on a rubber mill at 230° F. prior to introducing it into the screw stuffer. To prevent too much cooling in the barrel of the screw stuffer, this should be maintained at 100-150° F. Wire coated in this manner with the above composition after proper annealing at 200-300° F. is smooth, tough and does not become brittle at temperatures as low as -40° F.

It is within the scope of this invention to modify any of the polymers that may be prepared by the conjoint polymerization of vinyl chloride with fumaric esters. Thus, vinyl chloride may be copolymerized with dimethyl fumarate, diethyl fumarate, diisobutyl fumarate, di-n-butyl fumarate, and dibenzyl fumarate. The diethyl and dimethyl fumaric esters are preferred for the preparation of these interpolymers since they are higher softening and can tolerate higher proportions of these preferred modifiers. It is also within the scope of this invention to modify polymers obtained by polymerizing vinyl chloride with fumaric esters in weight ratios ranging from about 1:19 to about 19:1. In fact, any of the compositions disclosed in copending application of H. W. Arnold, Ser. No. 427,921, filed January 23, 1942, may be used for the preparation of the compositions of this invention.

A wide variety of alkoxyalkyl esters of organic carboxylic acid having at least two oxygen-bearing functional groups may be used in the preparations of plastic compositions based on vinyl chloride-fumaric ester copolymers. By the term "alkoxyalkyl" as used here we mean a monovalent group of atoms containing hydrogen, carbon, and oxygen, at least one oxygen atom being linked as an ether oxygen between two carbon atoms. The following radicals given below will serve to illustrate the use of the term:

| | |
|---|---|
| $C_2H_5O-CH_2-CH_2-$ | Ethoxyethyl radical |
| $CH_3-O-CH_2-CH_2-$ | Methoxyethyl radical |
| $C_4H_9-O-CH_2-CH_2-$ | Butoxyethyl radical |
| $CH_3-O-CH_2-O-CH_2-CH_2-$ | Methoxymethoxyethyl radical |
| $C_6H_5CH_2-O-CH_2-CH_2-$ | Benzyloxyethyl radical |

The alkoxyalkyl esters that may be used in the preparation of the compositions of this invention include among others di-(2-methoxyethyl), di-(2-ethoxyethyl), di-(2-butoxyethyl), esters of succinic, glutaric, adipic, pimelic, sebacic, azelic, phthalic, and tartaric acids. It is preferred that the short chain acids such as succinic and tartaric be esterified with alkoxyalkyl alcohols containing at least 6 carbon atoms in order to obtain plastic compositions which do not change on aging at elevated temperatures. These factors are regulated by the use to which the composition is to be put. Other compositions coming within the scope of this invention include vinyl chloride-fumaric ester copolymer compositions containing 2-methoxyethyl, 2-ethoxyethyl, 2-butoxyethyl esters of acetylated ricinoleic acid, alkoxyalkyl citrates such as tri-(butoxyethyl) citrate. It is preferred that if hydroxy acids are used for the preparation of these modifiers that the free hydroxyl group be esterified to produce improved compatibility characteristics. Materials of this type include, among others, acylated alkoxyalkyl esters of citric acid as acetyl tri-(2-butoxyethyl) citrate and acylated alkoxyalkyl esters of hydroxy acetic acid. Additional modifiers that may be mentioned include di-(2-benzyloxyethyl) sebacate, di-(ethoxyethoxyethyl) phthalate, butoxyethoxyethyl levulinate and di-(2-benzyloxyethyl) adipate and alkoxyalkyl esters of such acids as malic, maleic, citraconic, mesoconic, benzoylbenzoic, naphthoyl benzoic, hydroxybenzoic, aconitic, pyruvic, and tricarballylic, may also be used. These esters can be prepared by the direct esterification of the acid with the alkoxyalkyl alcohol or by the ester-interchange process well known in the art. Esters of organic acids having at least two oxygen-bearing functional groups and alcohols of the type $ROCH-O(CH_2)_2OH$ which generally represents such alcohols as (methoxy methoxy) ethanol, $CH_3OCH_2O(CH_2)_2OH$, (ethoxy methoxy) ethanol, $C_2H_5OCH_2O(CH_2)_2OH$, (propoxy methoxy) ethanol, $C_3H_7OCH_2O(CH_2)_2OH$, (butoxy methoxy) ethanol, $C_4H_9OCH_2O(CH_2)_2OH$, among others, may be used in the preparation of the compositions of this invention. These esters are prepared by the processes disclosed in U. S. Patent No. 2,298,186 to J. C. Woodhouse and K. E. Walker. It is not essential that all the alkoxyalkyl ester groups of polycarboxylic acid esters be identical. Thus, mixed esters such as 2-butoxyethyl 2-methoxyethyl sebacate or 2-butoxyethyl butyl sebacate work equally well.

Although the materials of the type outlined above are excellent modifiers for vinyl chloride-fumaric ester copolymers alone, in some instances advantages are realized by using a mixture of two or more different modifiers at least one of which is an alkoxyalkyl ester of an organic acid having at least two oxygen-containing functional groups. Combinations, among others, that may be used, include an alkoxyalkyl ester as defined above blended with a proportion of such materials as dibutyl phthalate, dibutyl sebacate, dibenzyl sebacate, butyl phthalyl butyl glycolate, butyl acetyl ricinoleate, butyl ester of acetylated polymerized ricinoleic acid, acetylated castor oil, trioctyl phosphate, tricresyl phosphate, dioctyl adipate and tetrahydrofurfuryl adipate.

The percentage of modifying agent present depends largely on the properties desired in the finished product. Usually about 20 to 35% based on the weight of copolymer is satisfactory for most uses, although percentages outside of these ranges are satisfactory for some uses.

The compositions of this invention may be prepared by any of the means known in the art. Thus, the modifier may be mixed with a finely divided polymer by a milling or kneading process, preferably at an elevated temperature and, if desired, with the addition of a solvent or gelling agent such as acetone. In other cases when it is desirable to have the plastic mass in solution, the polymer and modifier may be dissolved in a suitable solvent such as ketones and mixtures of ketones and cyclic hydrocarbons. In some instances it is advantageous to add the modifier to the monomers before their polymerization or, if desired, the modifier may be thoroughly mixed with the dispersion after polymerization and used in this form or coagulated and further worked.

The compositions obtained by any of the procedures described above may be worked up further by calendering into sheets, by casting, by rolling, by extrusion or by a molding operation in order to obtain them in useful forms. The product may be used for the preparation of artificial leather, as flexible resistant coatings on fibrous bases such as paper, cloth, and a wide variety of fabrics, as lacquers, for the preparation of oil cloth, floor coverings, films, as an ingredient in the preparation of linoleum type compositions, for the preparation of fibers, as insulation and covering for wire, as the intermediate layer in the preparation of laminated glass, as leather finish, as sound recordings, shower curtains, aprons, tobacco pouches, for the preparation of flexible tubing and various other articles. In the preparation of some of these articles, it is preferred to modify the above compositions with other materials such as fillers, pigments of all kinds, dyestuffs, and the like. Stabilizers such as 1,2-epoxy compounds (phenoxypropylene oxide) may be added if desired.

It is apparent that many widely different embodiments of this invention may be made without departing from the spirit and scope thereof, and therefore, it is not intended to be limited except as indicated in the appended claims.

I claim:

1. A composition of matter comprising a copolymer of vinyl chloride and a neutral ester of a saturated alcohol and fumaric acid modified with an alkoxyalkyl ester of an aliphatic dicarboxylic acid containing 4 to 10 carbon atoms, said composition being resistant to cracking at a temperature of —50° C.

2. The composition of claim 1 in which the ratio of vinyl chloride to the fumaric ester is between 1:19 and 19:1.

3. The composition of claim 1 in which the fumaric ester is a lower neutral alkyl ester.

4. The composition of claim 1 in which the alkokyalkyl ester is di(butoxyethyl) sebacate.

5. The composition of claim 1 in which the plasticizer is a mixture of di(butoxyethyl) sebacate and dibutyl sebacate.

6. The composition of claim 1 in which the alkoxyalkyl ester is present in amount between about 20 and 35 per cent of the copolymer.

7. A composition of matter comprising 20 parts of a copolymer prepared by polymerizing conjointly 95 parts of vinyl chloride and 5 parts of diethyl fumarate, from 6 to 9 parts of di(butoxyethyl) sebacate, and a small amount of a 1,2-epoxy compound, said composition being resistant to cracking at a temperature of —50° C.

8. A composition of matter comprising about 5 parts of a copolymer of 95 parts vinyl chloride and 5 parts of a lower dialkyl fumarate, and from about 1 to 3 parts of di(butoxyethyl) sebacate, said composition being resistant to cracking at a temperature of —50° C.

9. A composition of matter comprising about 5 parts of a copolymer of 95 parts of vinyl chloride and 5 parts of a lower dialkyl fumarate, and from about 1 to 3 parts of di(butoxyethyl) sebacate, and a small amount of a 1,2-epoxy compound, said composition being resistant to cracking at a temperature of —50° C.

HENRY JOHN RICHTER.